United States Patent
Johnstone et al.

(10) Patent No.: US 7,204,932 B2
(45) Date of Patent: Apr. 17, 2007

(54) POLARIZATION ROTATORS

(75) Inventors: Robert Ian Johnstone, Towcester (GB); Robert Graham Walker, Northampton (GB); Robert Anthony Griffin, Northants (GB)

(73) Assignee: Bookham Technology plc, Northamptonshire (GB)

( * ) Notice: Subject to any disclaimer, the term of this patent is extended or adjusted under 35 U.S.C. 154(b) by 136 days.

(21) Appl. No.: 10/973,568

(22) Filed: Oct. 26, 2004

(65) Prior Publication Data

US 2005/0095741 A1 May 5, 2005

(30) Foreign Application Priority Data

Oct. 31, 2003 (GB) ................................. 0325465.3

(51) Int. Cl.
*B29D 11/00* (2006.01)

(52) U.S. Cl. .............................. 216/2; 216/24; 216/51; 216/57

(58) Field of Classification Search ...................... None
See application file for complete search history.

(56) References Cited

U.S. PATENT DOCUMENTS

| | | | | |
|---|---|---|---|---|
| 5,069,517 | A * | 12/1991 | Kersten et al. | 385/130 |
| 5,082,341 | A * | 1/1992 | Walker | 385/14 |
| 5,325,388 | A * | 6/1994 | Gupta et al. | 372/50.1 |
| 5,644,664 | A * | 7/1997 | Burns et al. | 385/2 |
| 7,035,486 | B2 * | 4/2006 | Griffin et al. | 385/3 |
| 2002/0051282 | A1* | 5/2002 | Tsuruma | 359/332 |
| 2002/0136478 | A1* | 9/2002 | Yasuyuki et al. | 385/2 |
| 2003/0152305 | A1* | 8/2003 | McGlashan-Powell et al. | 385/11 |
| 2003/0235385 | A1* | 12/2003 | Taylor et al. | 385/129 |
| 2005/0123242 | A1* | 6/2005 | Walker et al. | 385/40 |
| 2005/0185889 | A1* | 8/2005 | Xia et al. | 385/43 |
| 2006/0140530 | A1* | 6/2006 | Kim et al. | 385/8 |

FOREIGN PATENT DOCUMENTS

JP 10-78521 3/1998

OTHER PUBLICATIONS

International Search report for corresponding Application GB 0325465.3, dated Apr. 29, 2004.

* cited by examiner

*Primary Examiner*—Allan Olsen
(74) *Attorney, Agent, or Firm*—Renner, Otto, Boisselle & Sklar, LLP

(57) ABSTRACT

An improved method is provided for fabricating a polarisation rotator in a rib waveguide having a propagation axis and opposite side walls. The method includes etching a pit in the substrate surface to form a recess in one of the side walls of the waveguide, during formation of the waveguide on the substrate surface, so as to provide an asymmetric waveguide section for imparting polarisation rotation to radiation propagated along the propagation axis. Preferably the pit is formed by a wet etching step forming an upper side surface within the recess that is inclined relative the waveguide side walls, and the waveguide side walls are formed by a dry etching step to extend perpendicularly to the substrate surface. In addition the dry etching step forms a lower side surface adjoining the upper side surface within the recess and tilted relative to the upper side surface. Such a method is significantly simplified as compared with prior art production methods, as well as providing greater yield and more predictable device performance since mask alignment errors no longer affect the design parameters of the rotator.

12 Claims, 12 Drawing Sheets

Figure 4   CONVENTIONAL ART

Figure 5  CONVENTIONAL ART
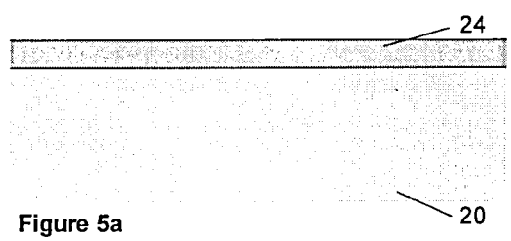
Figure 5a
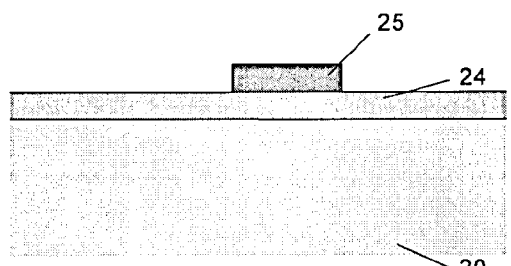
Figure 5b
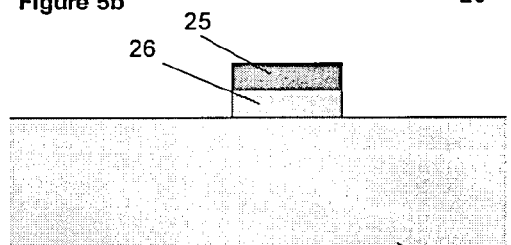
Figure 5c
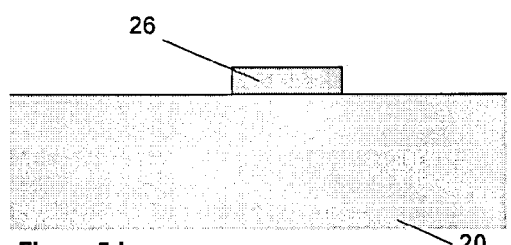
Figure 5d
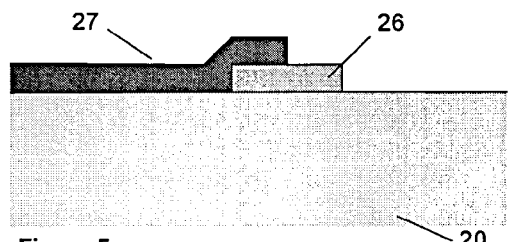
Figure 5e
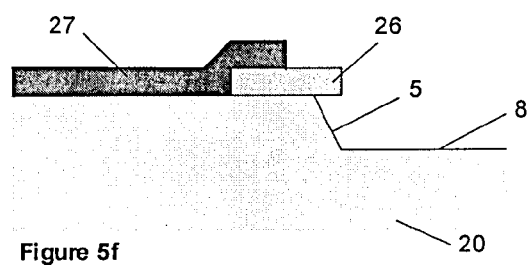
Figure 5f
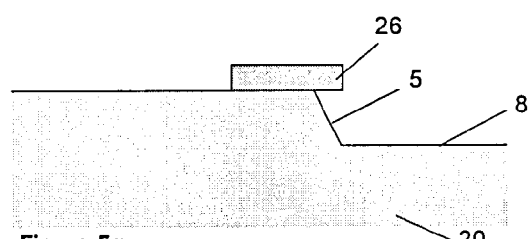
Figure 5g
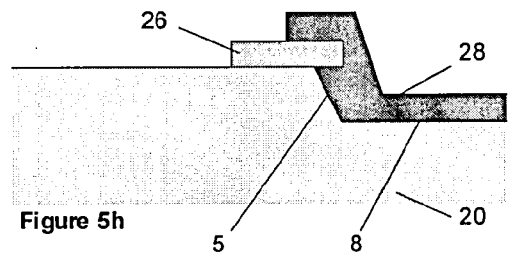
Figure 5h
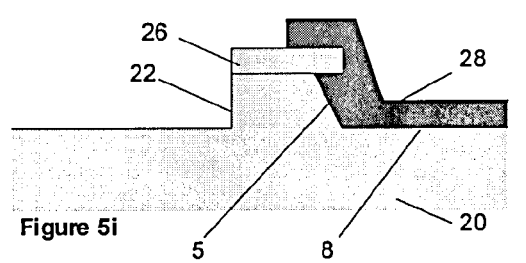
Figure 5i
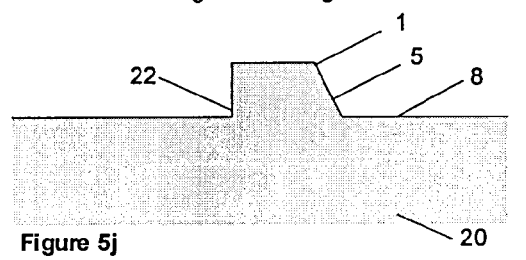
Figure 5j Figure 6
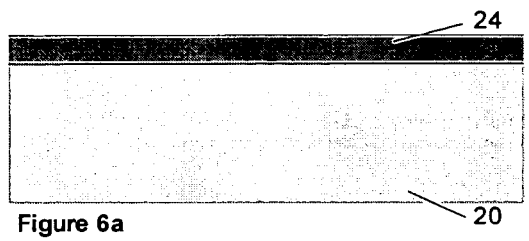
Figure 6a
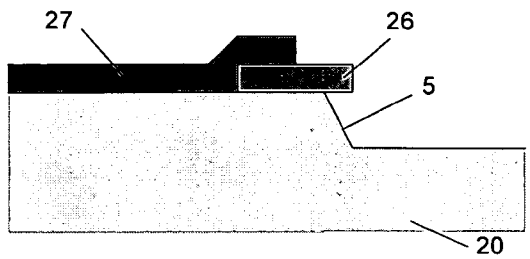
Figure 6f
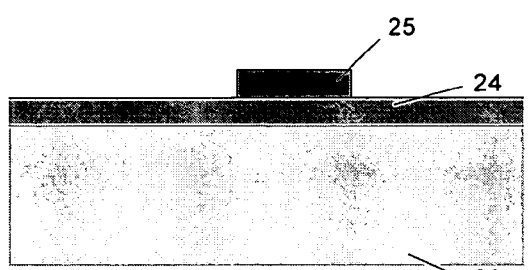
Figure 6b
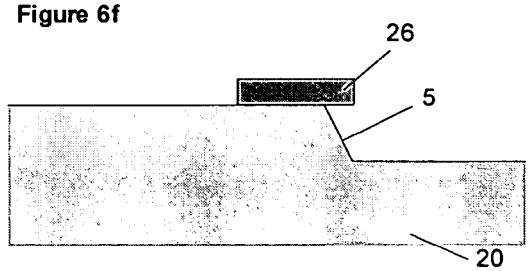
Figure 6g
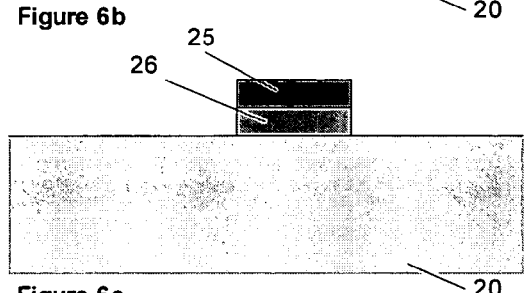
Figure 6c
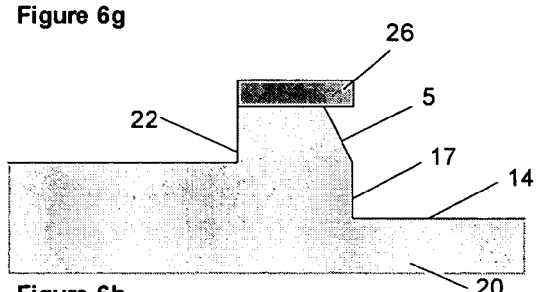
Figure 6h
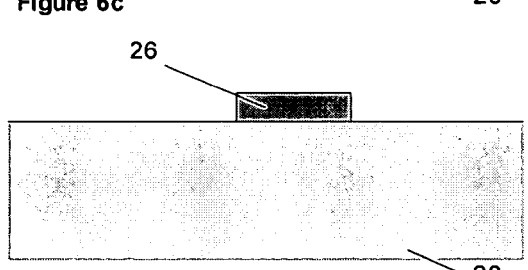
Figure 6d
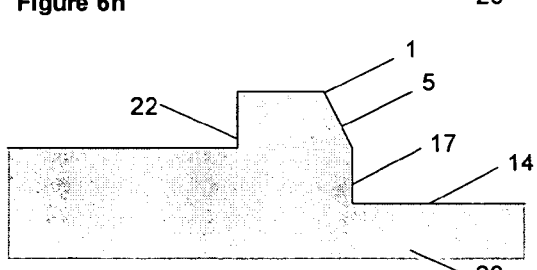
Figure 6i
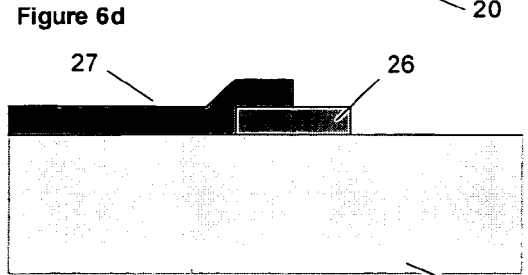
Figure 6e

POLARIZATION ROTATORS

BACKGROUND OF THE INVENTION

This invention relates to polarisation rotators and methods of fabricating such polarisation rotators.

V. P. Tzolov, M. Fontaine, "A passive polarisation converter free of longitudinally-periodic structure", Optics Communications, vol. 127, pp. 7–13, 1996, discloses a polarisation rotator formed by a section of a rib waveguide having an asymmetric cross-section as a result of one side wall of the waveguide being normal to the substrate surface and the other side wall of the waveguide being inclined so that radiation propagated along the optical axis of the waveguide is subjected to a rotation about the propagation axis.

J. Z. Huang, R. Scarmozzino, G. Nagy, M. J. Steel, R. M. Osgood, Jr., "Realisation of a compact and single-mode optical passive polarisation converter", IEEE Photonics, Technology Letters, vol. 12, no. 3, pp. 317–319, March 2000, refers to such an angled facet polarisation rotator, and describes a possible method of fabrication of such a polarisation rotator using two separate etch processes, namely a dry etching process, such as chemically assisted ion beam etching (CAIBE), for producing a vertical facet on one side of the waveguide, and a wet etching process for producing a tilted facet on the opposite side of the waveguide. The fabrication process as described in this reference uses lithographic patterning and etching steps to form the combined structure containing a tilted facet and a vertical facet. This renders the fabrication process relatively complex and low yield as a result of mask alignment difficulties, as is described in more detail below with reference to the drawings.

B. M. A. Rahman, S. S. A. Obayya, N. Somasiri, M. Ragarajan, K. T. V. Grattan, H. A. El-Mikathi, "Design and characterisation of compact single-section passive polarisation rotator", Journal of Lightwave Technology, vol. 19, no. 4, April 2001, also provides a discussion of such a polarisation rotator.

It is an object of the invention to provide an improved polarisation rotator, and a method of fabricating such a polarisation rotator.

SUMMARY OF THE INVENTION

According to one aspect of the present invention there is provided a method of fabricating a polarisation rotator in a rib waveguide having a propagation axis and opposite side walls, the method including, during formation of the waveguide on a surface of a substrate, etching a pit in the substrate surface so as to form a recess in one of the side walls of the waveguide forming an asymmetric waveguide section for imparting polarisation rotation to radiation propagated along the propagation axis, the pit being formed by a first etching step forming an upper side surface within the recess tilted relative to the other side wall of the waveguide, followed by a second etching step forming the side walls of the waveguide, characterised in that the second etching step additionally forms a lower side surface adjoining the upper side surface and tilted relative to the upper side surface.

According to another aspect of the present invention there is provided a polarisation rotator comprising a substrate, a rib waveguide on a surface of the substrate having a propagation axis and opposite side walls, an etch pit forming a recess in one of the side walls of the waveguide to provide an asymmetric waveguide section for imparting polarisation rotation to radiation propagating along the propagation axis, the pit having an upper side surface within the recess formed by a first etching step and tilted relative to the other side wall of the waveguide, and the side walls of the waveguide being formed by a second etching step, characterised in that the pit further includes a lower side surface formed by the second etching adjoining the upper side surface and tilted relative to the upper side surface.

Such a polarisation rotator has the advantage that it can be fabricated more simply than the rotators described above in that one of the masking steps can be omitted. Whilst, in the prior fabrication process referred to above, further photolithographic masking and patterning is applied intermediate the wet etching step and the dry etching step in order to screen parts of the substrate during dry etching, such screening is not necessary during fabrication of the polarisation rotator in accordance with the present invention.

In a preferred implementation of the fabrication method of the invention, in forming the waveguide, a patterned masking layer is applied to the substrate surface to define the shape of the waveguide to be etched. The patterned masking layer may be formed by applying a layer of masking material to the substrate surface, covering the layer with photoresist, lithographically patterning the photoresist, etching the layer using the photoresist as a mask and removing the photoresist. The patterned masking layer, which may be a silica layer, may be removed after etching of the waveguide.

Furthermore, in a preferred implementation of the fabrication method of the invention, in the first etching step, a wet etching mask is applied to the substrate surface so as to cover selected parts of the substrate surface and wet etching is then performed so as to etch the pit in the part of the substrate surface not covered by the mask. The wet etching mask may be formed by a layer of photoresist that is removed after wet etching.

Furthermore, in a preferred implementation of the fabrication method of the invention, in the second etching step, dry etching is performed with only the area in which the waveguide is to be formed masked so as to etch those parts of the substrate surface on either side of that area.

The recess in the waveguide usually has end facets inclined relative to or normal to the propagation axis. The end facets of the recess may be inclined at equal but opposite angles to the normal to the propagation axis. Furthermore the upper side surface within the recess in the waveguide may be a plane surface terminating at the end facets.

The etch pit may provide a depression in the substrate surface to one side of the waveguide immediately adjacent the recess in the waveguide. The depression in the substrate surface may have a substantially square or rectangular profile, and may have sloping sides except where it abuts the waveguide.

The invention also provides an optical device comprising a first waveguide having opposite side walls, preferably formed by wet etching, so as to be inclined relative to one another, a second waveguide having opposite side walls, preferably formed by dry etching, so as to be substantially parallel to one another, and a waveguide interface having a first end coupled to the first waveguide, a second end coupled to the second waveguide and a tapering portion intermediate the first end and the second end.

The invention also provides an optical device comprising an optical fibre connector, a second waveguide having opposite side walls, preferably formed by dry etching, so as to be substantially parallel to one another, and a waveguide interface having a first end coupled to the optical fibre connector, a second end coupled to the second waveguide and a tapering portion intermediate the first end and the second end.

BRIEF DESCRIPTION OF THE DRAWINGS

In order that the invention may be more fully understood, reference will now be made, by way of example, with the accompanying drawings, in which:

FIGS. 5a–j showing successive steps in the production of a further prior art polarisation rotator;

FIGS. 6a–i show successive steps in the production of a polarisation rotator according to the invention;

DETAILED DESCRIPTION OF THE DRAWINGS

Figure 1:
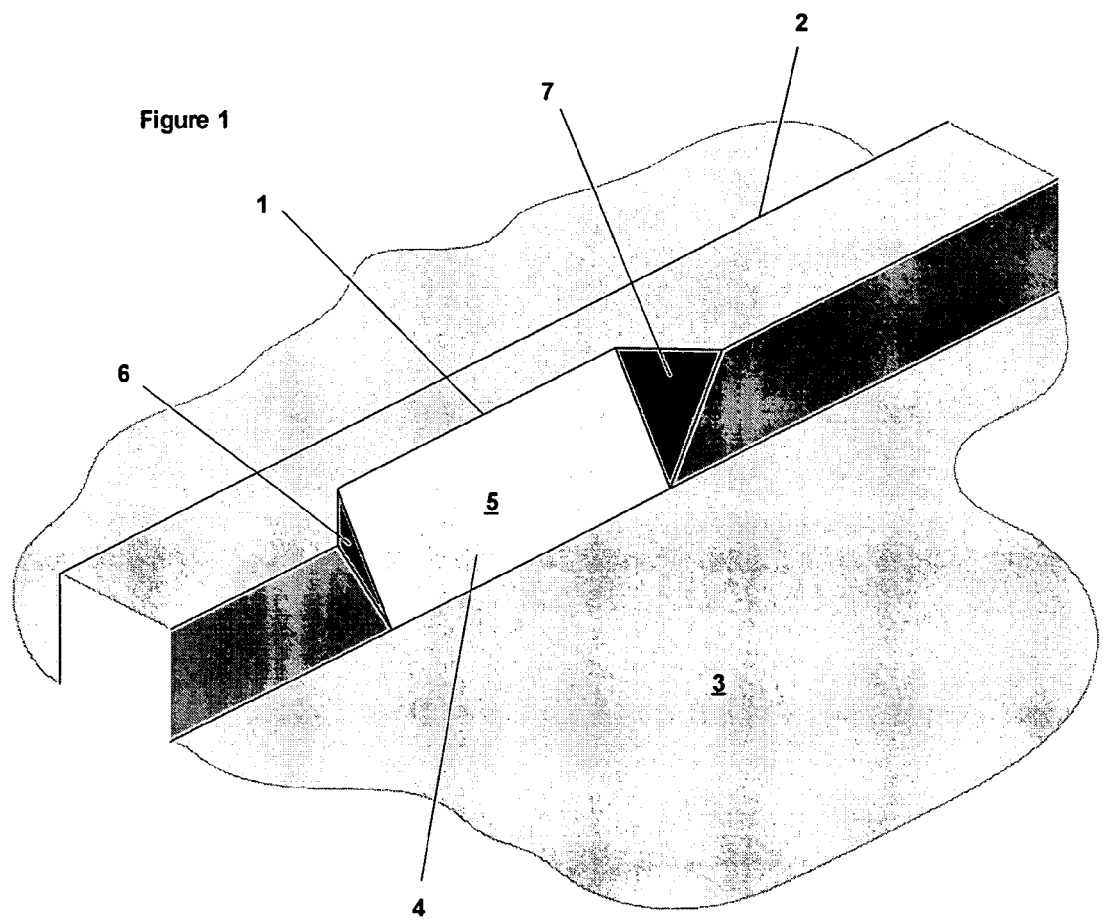
FIG. 1 is a perspective view of the ideal design of a polarisation rotator within a waveguide.

FIG. 1 shows the theoretical ideal design for a polarisation rotator 1 formed within a rib waveguide 2 on a substrate surface 3. The polarisation rotator 1 is formed by an elongate recess 4 defined by a tilted side surface 5 and end facets 6 and 7 in the vicinity of the polarisation rotator 1. The section of the waveguide 2 in which the polarisation rotator 1 is formed is defined by a combination of an anisotropic dry etching step, which produces vertical features, and an isotropic wet etching step which produces features preferentially orientated along a defined crystallographic plane.

Figure 2A:
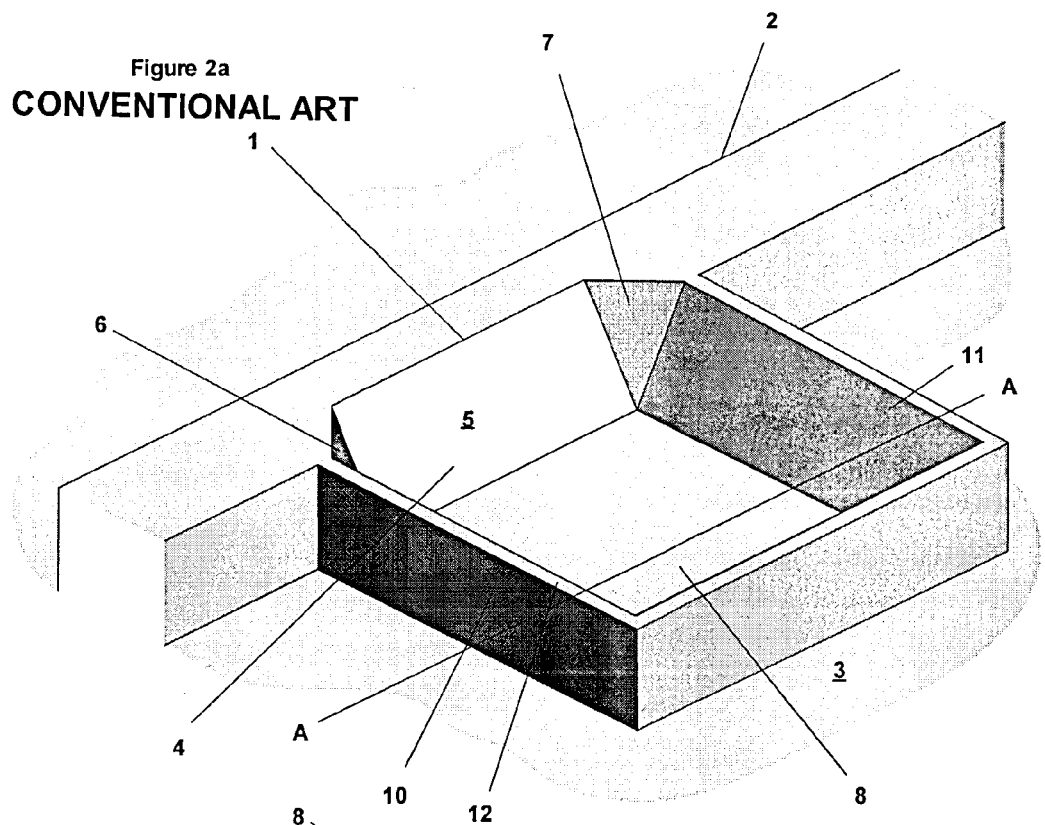
FIGS. 2a and 2b are perspective and side views of a prior art polarisation rotator design.

FIG. 2a shows a similar view of a prior art polarisation rotator 1 within a waveguide 2 in which ridges 10 and 11 are provided surrounding an etch pit 8 produced by the wet etching process used to produce the recess 4 defining the polarisation rotator 1.

Figure 2B:
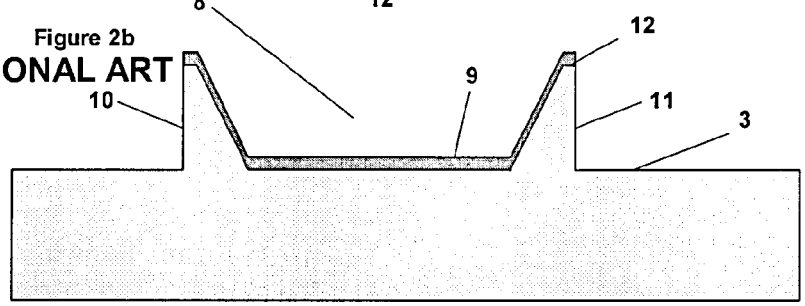

One method for producing the prior art polarisation rotator 1 shown in FIG. 2a is a two mask-step process, similar to that described in the paper by Huang et al referenced above. In this process, after the formation of the etch pit 8 by the initial wet etching process, the regions of the waveguide 2, the etch pit 8, and the surrounding ridges 10, 11 (including the tops of the ridges) are masked by a layer 9 of photoresist during a dry etching step, as shown in the cross-section of FIG. 2b taken along the line A—A in FIG. 2a, and then the bottom of the etch pit 8 is exposed during subsequent wet etching. A disadvantage of this design of prior art polarisation rotator is that the recess 4 defining the polarisation rotator 1 can vary significantly depending on the alignment of the etch pit 8 with the waveguide 2, producing unpredictable variations in the properties of the polarisation rotator 1.

A further method for producing the prior art polarisation rotator 1 shown in FIG. 2a is a three mask-step process. In this process the etch pit 8 is produced by wet etching. It is then possible to mask the bottom and sides of the etch pit 8 including the tops of the ridges 10, 11 during subsequent dry etching, using a layer 9 of photoresist (which is preferable to a silica mask requiring further patterning steps) as shown in the cross-section of FIG. 2b taken along the line A—A in FIG. 2a. However such a process has the disadvantage that the ridges 10 and 11 formed at the edges of the pit 8 by the subsequent dry etching step used to define the side walls of the waveguide 2 can vary significantly depending on the alignment of the photoresist layer 9 with the etch pit 8 formed by the previous wet etching step. This can result in unpredictable variations in the properties of the polarisation rotator.

Nevertheless it will be appreciated that the ridges 10, 11 at the edges of the pit 8 which is produced in both prior art methods are unwanted, and, in the case of extreme misalignment of the photoresist mask overlapping of the areas that are etched in each etch step can result in the production of unwanted ditches in the structure, thus producing optical loss in use of the polarisation rotator 1.

Figure 3:
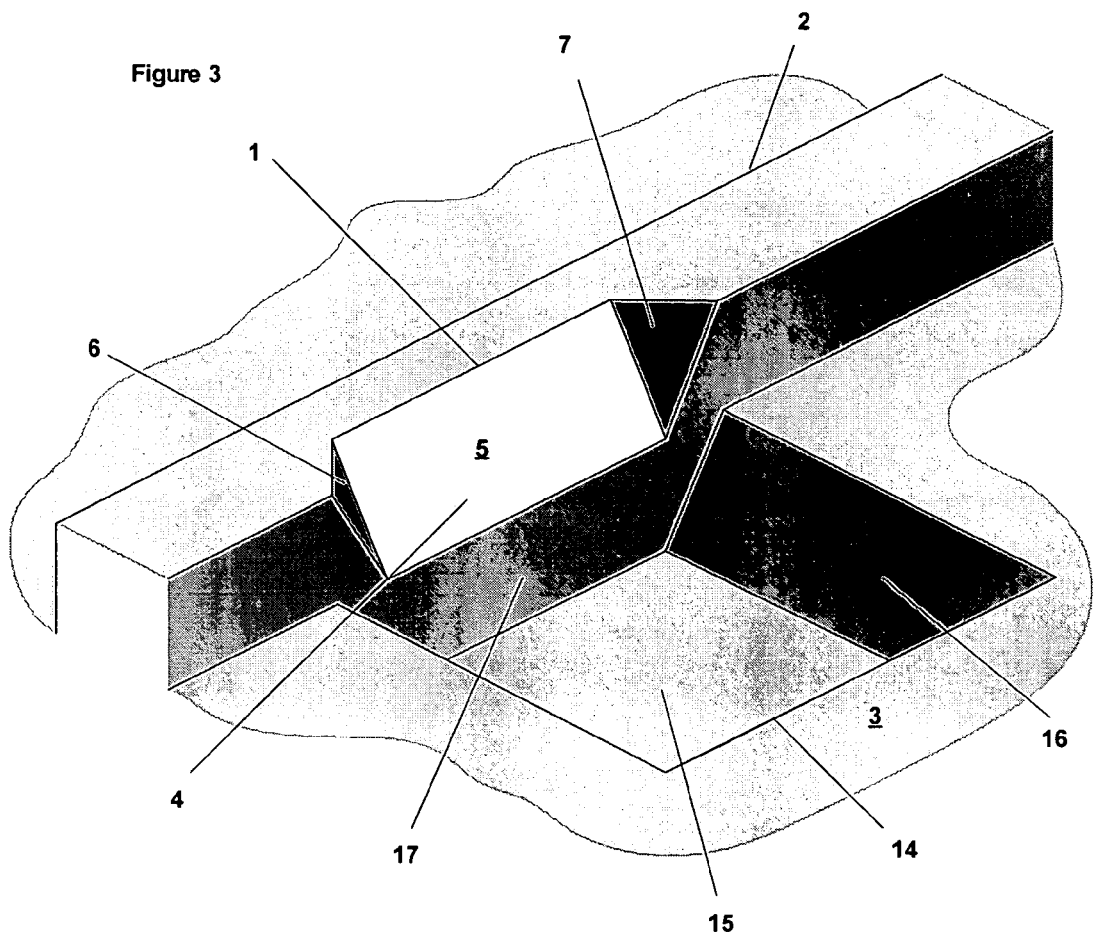
FIG. 3 is a perspective view of a polarisation rotator design in accordance with the invention.

By contrast, in the case of the preferred arrangement in accordance with the invention to be described more fully below, and in which the wet etch precedes the dry etch, a photoresist layer is not applied to the bottom of the etch pit prior to the dry etching step, and accordingly an etch pit 14 having a flat bottom 15 and sloping side walls 16 is produced, as shown in FIG. 3. A particular feature of this arrangement is that, during the dry etching step in which the side walls of the waveguide 2 are formed, the pit 14 is also fully etched so as to produce a vertical side surface 17 on the side of the pit 14 adjacent the waveguide 2 immediately below and adjoining the tilted side surface 5 of the recess 4 forming the polarisation rotator 1. Because the dry etching step is anisotropic, it also has the effect of extending the sloping side walls 16 of the pit 14 which have a sloping orientation as a result of the preceding wet etching step. Because it is not necessary to mask the bottom of the etch pit during this process, it will be appreciated that not only is the process simplified as compared with the prior art process, but also variations in the properties of the polarisation rotator as a result of misalignment of the masking of the two etch steps are avoided.

The differences between the prior art production processes and the preferred production process in accordance with the invention will now be emphasised by descriptions of the successive steps of these process with reference to FIGS. 4, 5 and 6.

Figure 4A:
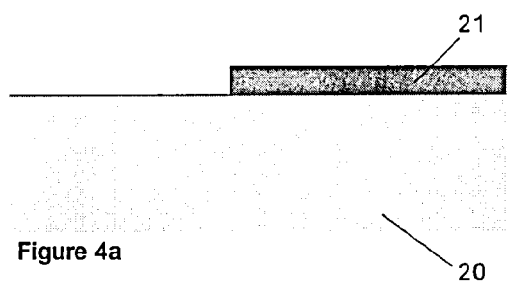
FIGS. 4a–f show successive steps in the production of a prior art polarisation rotator.

Referring first to FIG. 4, the two mask-step prior art production process (similar to that described in the referenced paper by Huang et al) begins with the deposition of a layer 21 of photoresist on the upper surface of a silicon substrate 20 and patterning of the photoresist layer 21 by exposing of the layer to radiation through a patterned exposure mask and subsequent dissolving away of the areas of photoresist that are not required (either the exposed areas or the unexposed areas depending on the nature of the photoresist) to produce the arrangement shown in FIG. 4a. This mask is intended to mask those areas which are not required to be etched by the dry etching process.

Figure 4D:
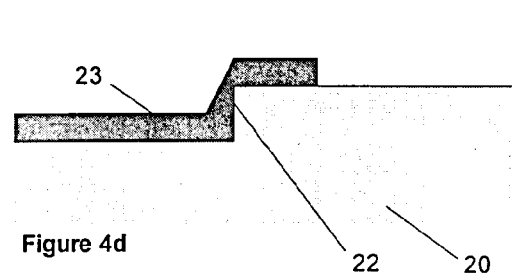
Figure 4B:
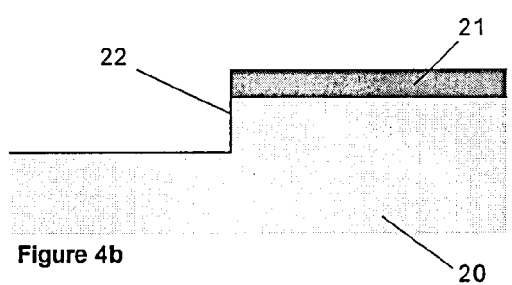
Figure 4E:
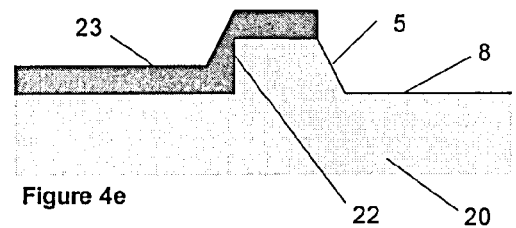
Figure 4C:
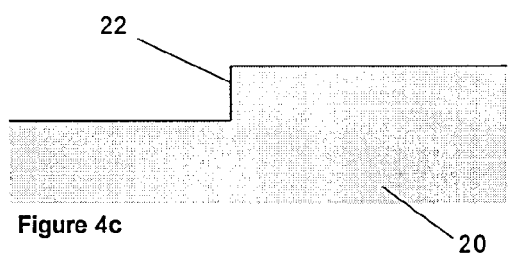
Figure 4F:
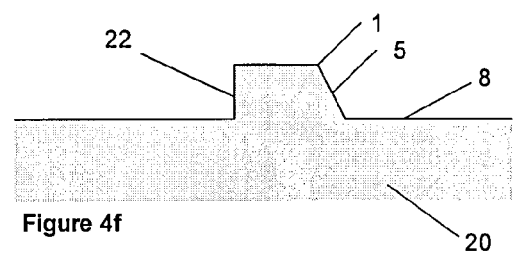

Subsequently the dry etching process is applied to etch the vertical side wall 22 of the polarisation rotator 1 and the vertical side walls of the waveguide as well as around the perimeter of the etch pit 8, as shown in FIG. 4*b*. Subsequently the photoresist layer 21 is removed, as shown in FIG. 4*c*. A further photoresist layer is then deposited over the whole of the substrate surface, and patterned by exposure through an exposure mask and removing of the unwanted areas of photoresist in a manner already described above, so as to leave a patterned photoresist layer 23 covering the waveguide and the tops of the ridges surrounding the etch pit 8, which are those areas where the wet etch is not to be applied, as shown in FIG. 4*d*. As shown in FIG. 4*e* the wet etching step is applied with the photoresist mask in place so as to etch the etch pit 8, the nature of the wet etching process being crystalographically limited, such as to provide the pit with sloping side walls, including a tilted side surface 5 in the vicinity of the intended location of the polarisation rotator 1 that does not undercut the patterned photoresist layer 23. This side surface 5 defines the recess 4 of the polarisation rotator 1. Thereafter the photoresist layer 23 is removed, as shown in FIG. 4*f*.

Referring to FIG. 5, the three mask-step prior art production process (and the process of the invention) begins with the deposition of a silica layer 24 on the upper surface of a silicon substrate 20, as shown in FIG. 5*a* (and 6*a*), using a conventional deposition process, such as chemical vapour deposition or molecular beam epitaxy for example. An initial patterning and etching process is then applied to produce a patterned silica layer defining the shape of the required waveguide. This involves deposition of a layer 25 of photoresist on top of the silica layer 24 and patterning of the photoresist layer 25 by exposing the layer to radiation through a patterned exposure mask and subsequent dissolving away of the areas of photoresist that are not required (either the exposed areas or the unexposed areas depending on the nature of the photoresist) to produce the arrangement shown in FIG. 5*b* (and 6*b*). Subsequently a wet or dry etching step takes place so as to produce a patterned silica layer 26 having the required shape of the waveguide, as shown in FIG. 5*c* (and 6*c*), the photoresist layer 25 being subsequently chemically removed to provide the arrangement of FIG. 5*d* (and 6*d*).

In a further step shown in FIG. 5*e* (and 6*e*) a patterned photoresist layer 27 partially overlapping the patterned silica layer 26 is applied by initially coating the whole of the upper surface with a layer of photoresist and then exposing the layer through an exposure mask and removing the unwanted areas of photoresist in a manner already described above. This mask is intended to mask those areas which are not required to be etched by the wet etching process, that is those areas of the waveguide and the surrounding substrate where the etch pit is not to be produced.

All of the process steps described above are common to the three mask-step prior art production method and the preferred production method of the invention. Reference will now be made to FIGS. 5*f* to 5*j* showing the further steps used in the three mask-step prior art production method. As shown in FIG. 5*f* the wet etching step is applied with the photoresist mask in place so as to etch the etch pit 8, the nature of the wet etching process being kinetically limited such as to provide the pit with sloping side walls, including a tilted side surface 5 in the vicinity of the intended location of the waveguide that undercuts the patterned silica layer 26. This side surface 5 defines the recess 4 of the polarisation rotator 1. Thereafter the photoresist layer 27 is removed, as shown in FIG. 5*g*, and a further photoresist layer is deposited over the whole of the substrate surface, including the etch pit 8, and patterned by exposure through an exposure mask and subsequent removal of the photoresist layer in the areas not required, so as to leave a patterned photoresist layer 28 covering the bottom of the etch pit 8 including the tilted side surface 5 and overlapping the silica layer 26 in the required location of the polarisation rotator, as shown in FIG. 5*h*. The dry etching process is then applied to etch the vertical side walls of the waveguide 2 except in the vicinity of the recess 4 defining the polarisation rotator 1 where the tilted side surface 5 and associated etch pit 8 is masked by the patterned photoresist layer 28, as shown in FIG. 5*i*. Subsequently the photoresist layer 28 is removed, and the patterned silica layer 26 is also removed using a conventional etching process, to leave the required waveguide and polarisation rotator structure as shown in FIG. 5*j*.

It should be noted that the the two mask-step prior art production process has been described utilising a crystallographically limiting wet etching process, and that the three mask-step prior art production process has been described utilising a kinetically limiting wet etching process. A crystallographic etch aligns, to a reasonable extent, with crystallographic planes of the material, that is the etch is anisotropic, so that undercutting is not produced to any significant extent. On the other hand a kinetically limited etch tends to be closer to isotropic, typically does not follow crystallographic planes, and consequently does produce some undercutting.

The initial steps of the preferred production method of the invention (FIGS. 6*a* to 6*e*) are the same as those of the three mask-step prior art production process (FIGS. 5*a* to 5*e*) described above. Referring now to FIGS. 6*f* to 6*i*, the following process steps of the preferred production method of the invention will now be described, beginning with the wet etching step producing the etch pit including the tilted side surface 5, as shown in FIG. 6*f*, in precisely the same manner as the corresponding wet etching step used in the three mask-step prior art production process (see FIG. 5*f*). As in the prior art production process, the photoresist layer 27 is then removed so as to provide an arrangement as shown in FIG. 6*f*. Thereafter, however, instead of a further patterned photoresist layer being applied to cover the bottom and sides of the etch pit including the tops of the surrounding ridges and the side surface 5, no such photoresist mask is provided, but instead the dry etching step is applied without the etch pit being masked. As a result, in addition to the vertical etching of the side walls of the waveguide 2, the dry etching step also etches the bottom of the pit so as to provide a deeper etch pit 14 having sloping sides (since the dry etching will preserve the shapes of the existing sloping side walls where these are not masked) except where the silica layer 26 provides masking in the intended position of the polarisation rotator where a vertical side surface 17 is produced immediately below and adjoining the tilted side surface 5, as shown in FIG. 6*h*. Subsequently the silica layer 26 is removed, leaving the waveguide 2 with integral polarisation rotator 1 formed, as shown in FIG. 6*i* (corresponding to the view of FIG. 3).

It will be appreciated that the preferred method of the invention is significantly simplified as compared with the described three mask-step prior art production method, in that two production steps are omitted, namely the provision of a further photoresist mask prior to the dry etching step, and subsequent removal of the photoresist mask after the dry etching step. The following table emphasises the sequence of steps provided in the two production methods, and the differences between the production methods in terms of the steps omitted in the preferred method of the invention.

| FIG. | Prior Art Method | FIG. | Method of Invention |
|---|---|---|---|
| 5a | Deposit silica | 5a | Deposit silica |
| 5b | Apply photoresist mask 1 | 5b | Apply photoresist mask 1 |
| 5c | Wet/dry etch silica | 5c | Wet/dry etch silica |
| 5d | Dissolve photoresist mask 1 | 5d | Dissolve photoresist mask 1 |
| 5e | Apply photoresist mask 2 | 5e | Apply photoresist mask 2 |
| 5f | Wet etch | 6f | Wet etch |
| 5g | Remove photoresist mask 2 | 6g | Remove photoresist mask 2 |
| 5h | Photoresist mask 3 | — | |
| 5i | Dry etch | 6h | Dry etch |
| 5j | Removal of photoresist mask 3 | — | |
| 5f | Remove silica | 6i | Remove silica |

Not only is the preferred method of the invention simpler but it also provides greater yield and more predictable device performance since mask alignment errors no longer affect the design parameters of the rotator, such as the rotator waveguide/feed waveguide junction and the separation between the tilted side surface 5 and the vertical wall 22 of the rotator, to which device performance is highly sensitive. This overcomes the problems of the two mask-step prior art process, similar to that disclosed by Huang et al, in which mask alignment errors are liable to result in considerably reduced production yields.

Furthermore the preferred method of the invention provides a further improvement by avoiding the use of an unwanted ridge structure as is produced by prior art methods. Alignment errors between the processing masks in the prior art methods affect the parameters of the ridge, consequently affecting the optical losses of the device.

Figure 7A:
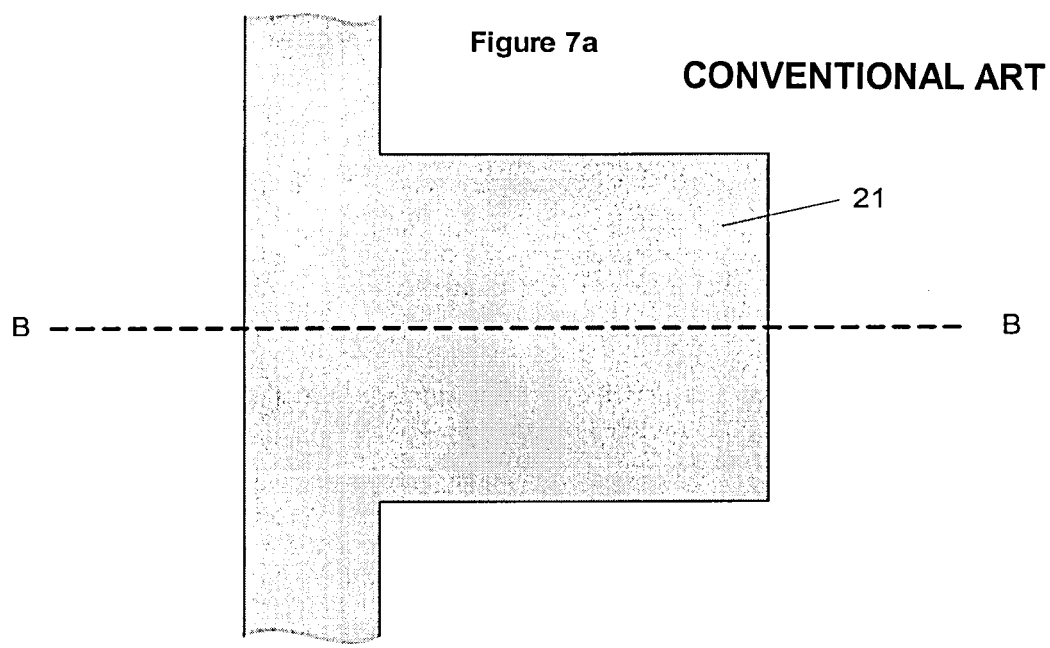
FIGS. 7a and 7b show processing masks used in two steps of a possible prior art production process.
Figure 7B:
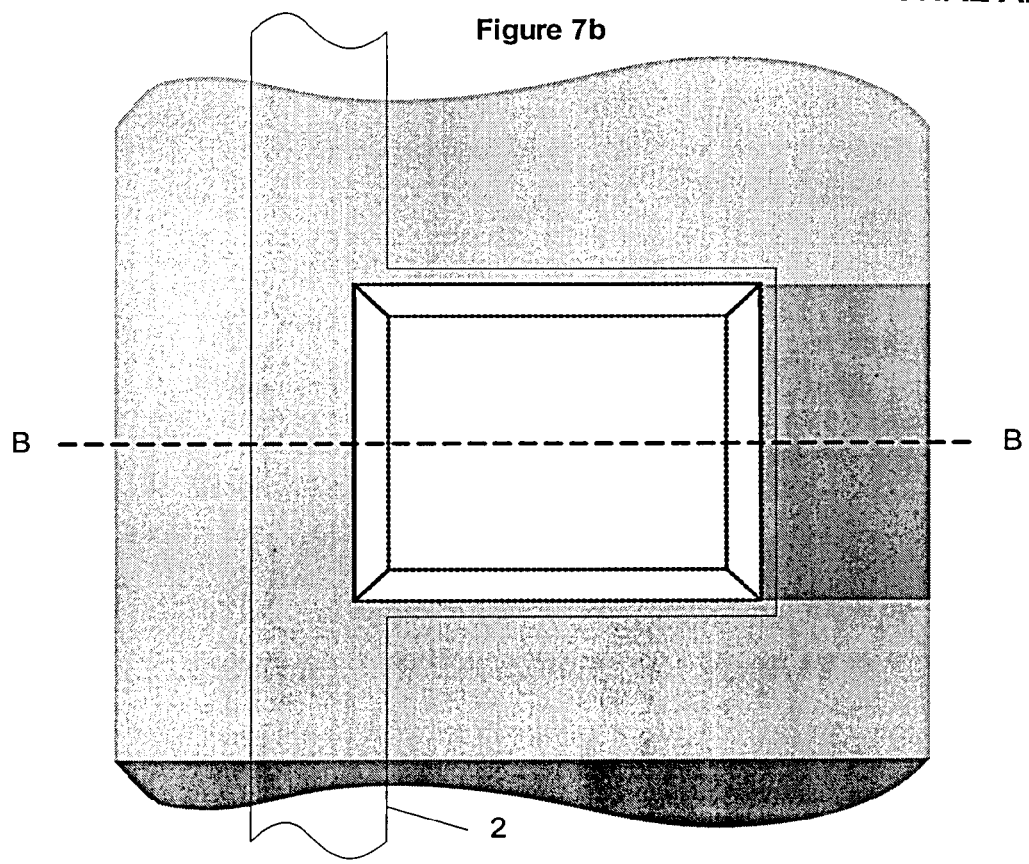

FIG. 7a is a plan view of the mask applied immediately prior to the dry etching step in the two mask-step prior art production process. FIG. 7a shows the extent of the patterned photoresist layer 21 defining the intended shape of the waveguide and the etch pit, and the surroundingtridges including the tops of the ridges defined by the overlap margin outside the edges of the etch pit sides. FIG. 7b is a plan view of the wet etch mask used immediately subsequent to the wet etching step in the two mask-step prior art production process. FIG. 7b shows the patterned photoresist layer 23 to enable etching of the etch pit and the sides of the etch pit. In these figures the line B—B denotes the section along which the views of FIG. 4 are taken.

Figure 8A:
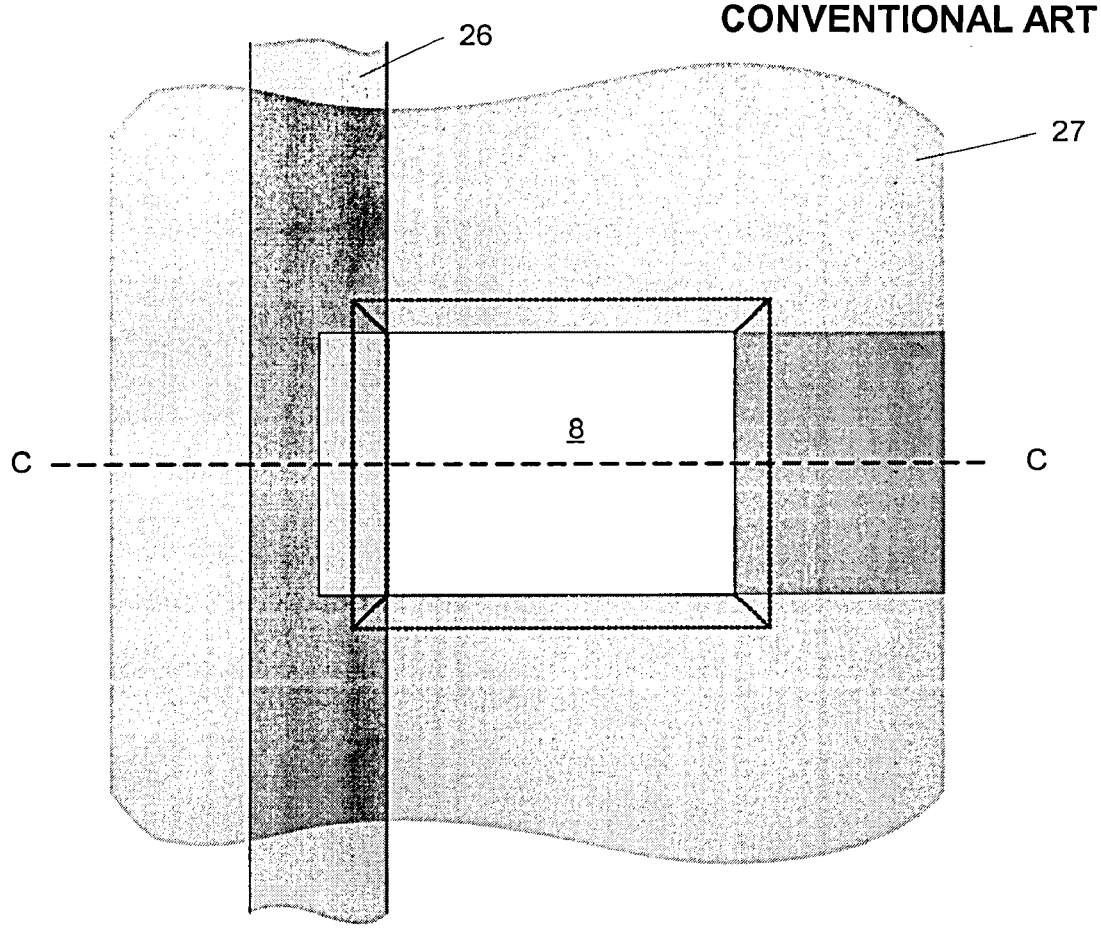
FIGS. 8a and 8b show processing masks used in two steps of another possible prior art production process.
Figure 8B:
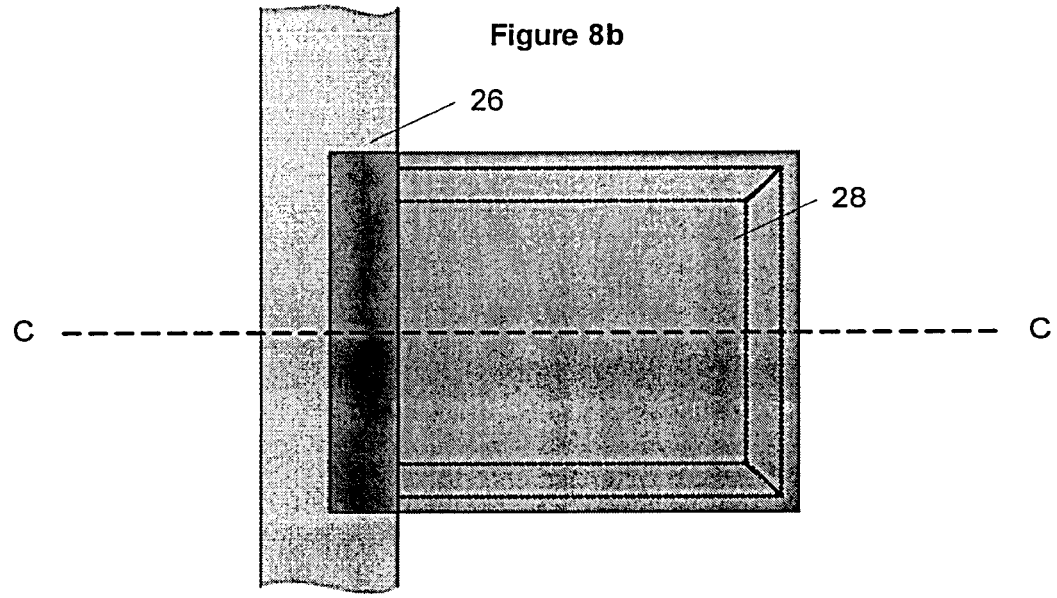

FIGS. 8a and 8b are plan views of the masks applied immediately prior to the wet etching step and immediately prior to the dry etching step in the three mask-step prior art production process. In particular FIG. 8a shows the extent of the patterned silica layer 26 defining the intended shape of the waveguide, and the patterned photoresist layer 27 overlying the substrate except in the location of the etch pit 8 and the region of the waveguide in which the polarisation rotator is formed so as to enable the etch pit 8 to be formed by the wet etching step. FIG. 8b shows the patterned silica layer 26 and the overlapping further patterned photoresist layer 28 overlying the bottom and parts of the side walls of the etch pit 8 so as to enable etching of the vertical sides of the waveguide by the dry etching step. In these figures the line C—C denotes the section along which the views of FIG. 5 are taken.

Figure 9A:
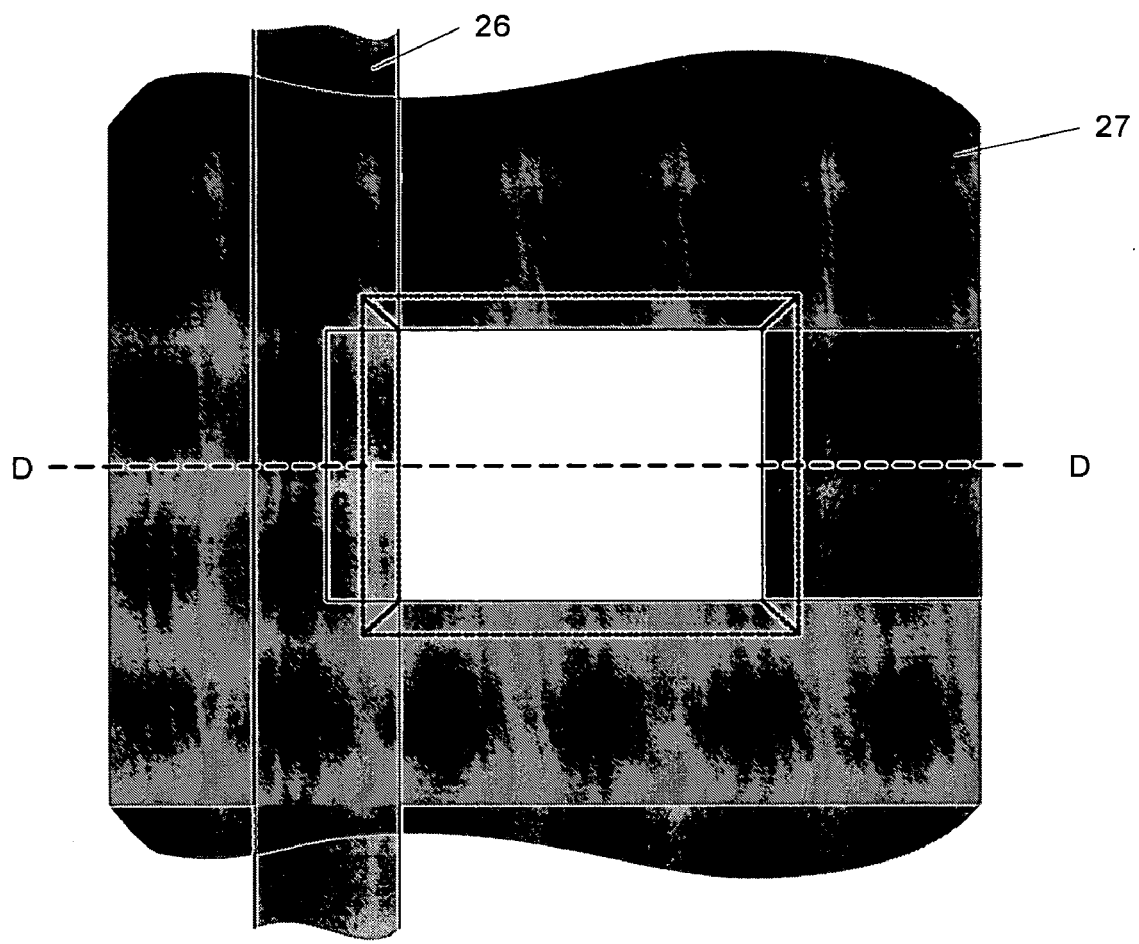
FIGS. 9a and 9b show two corresponding steps in the production process according to the invention.
Figure 9B:
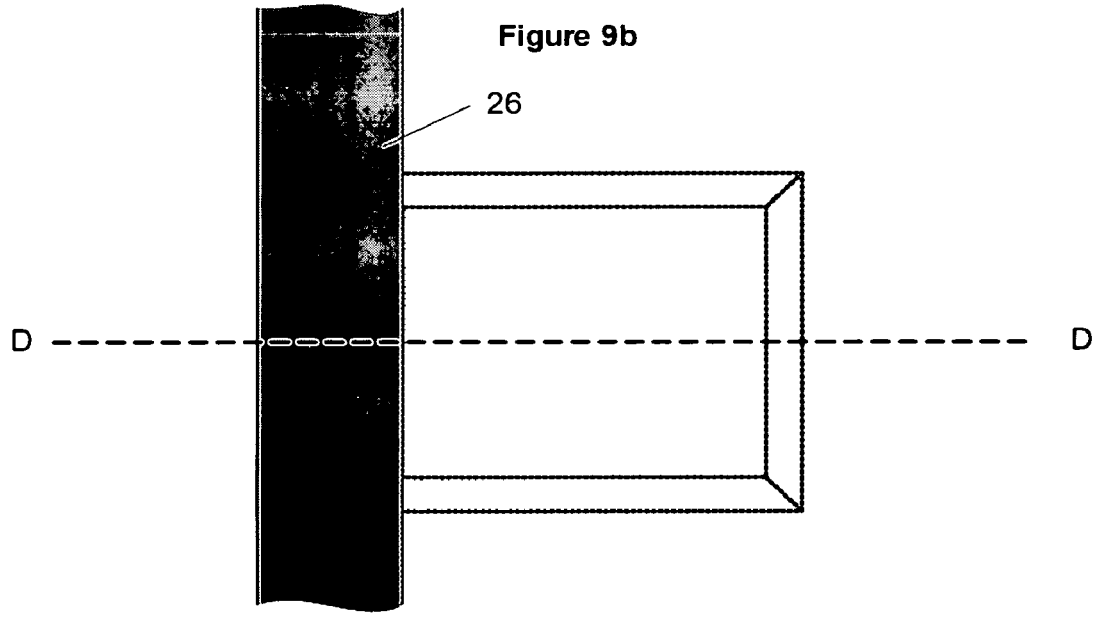

By contrast FIGS. 9a and 9b show corresponding plan views for the preferred production method of the invention, FIG. 9a showing the patterned silica layer 26 in association with the patterned photoresist layer 27 applied prior to the wet etching step precisely as in FIG. 8a. However, FIG. 9b shows the arrangement prior to the dry etching step in the preferred method of the invention, and it will be noted that, in this case, no masking of the etch pit is provided to prevent further etching of the etch pit. The line D—D in FIGS. 9a and 9b denotes the direction along which the sectional views of FIG. 6 are taken.

The use of silica and photoresist for masking in these two production methods is given only by way of example, and it will be appreciated that a variety of masking materials may be used in variations of these methods. Typical materials that are used for forming lithographic masks in semiconductor fabrication are photoresist, silica, silicon nitride, silicon oxy-nitride and various metals. However it would be preferable not to use exposed metals for masking during the dry etching stage that would normally be carried out in a plasma chamber.

Various etching processes that may be used for etching in these methods are well known. Typically the wet etching would be performed using an etchant comprising $H_3PO_4$, $H_2O_2$ and $H_2O$. A typical dry etching step would utilise $SiCl_4$ in reactive ion etching (RIE). It is not necessary to perform a polishing etch to smooth the sides of the dry etched waveguide, although such a polishing etch may be provided if required.

Although, in the drawings, the angled facets 6 and 7 of the recess 4 are shown at arbitrary angles, it is possible to impart a required relative angle between the crystallographic orientation of the wafer and the etch pit by careful choice of etch chemistry. The angles may even be approximately perpendicular to the propagation direction of the waveguide.

Other variations in the production method of the invention are contemplated within the scope of the invention claimed, including possibly the use of a lift-off step in which a patterned silica layer is produced by evaporating silica on top of a patterned photoresist layer and subsequently removing the photoresist layer with the silica on top. Furthermore, although the etch pit is shown as extending laterally outwardly from the edge of the waveguide to a substantial extent in the figures, it should be appreciated that in practice the etch pit may extend laterally outwardly from the waveguide by only a relatively small amount relative to the length of the required polarisation rotator. Also it should be appreciated that, by modification of the etch masks in a manner that would be well understood by one skilled in the art, the preferred production method can be modified to use wet etches with different properties from those described.

It should be appreciated that a similar device could be made by combining any two differently sloping wet etching steps, rather than combining a single wet etching step with a single dry etching step as described above. Furthermore, in an alternative fabrication process utilising wet and dry etching steps in combination, a dry etching step is used followed by a wet etching step, rather than the wet etching step preceding the dry etching step as in the fabrication process described with reference to FIG. 6, so as to result in a sloped side to the etch pit adjoining the sloped side of the polarisation rotator.

Any of the polarisation rotators described may be monolithically integrated with a modulator on a single chip, the modulator typically being a Mach-Zehnder interferometer (MZI), for example as shown in GB 2361071A, formed by two rib waveguides coupled to input and output waveguides by multi-mode interference couplers (MMI), for example of the type shown in FIG. 8 of GB 2367904A. Alternatively the polarisation rotator may be monolithically integrated with other types of optical device.

The design of polarisation rotator produced by the preferred method of the invention described above produces a very narrow waveguide, of the order of 2.5 um width, in GaAs and other III-V semiconductor materials with vertical side walls defined by the dry etching step. This structure is typically incompatible with the structure of wet etched waveguides in existing GaAs modulator technology that produces features with sloping side walls. For this reason it may be necessary to make use of a waveguide taper arrangement to couple such a polarisation rotator design to such wet etched waveguides in order to monolithically integrate the polarisation rotator with an existing GaAs modulator design or other GaAs devices. Such a taper is required to provide coupling between differently sized modes in wet etched rib waveguides and dry etched ridge waveguides, the former producing a broad, approximately elliptical optical mode, and the latter producing a tight, relatively circular mode. The waveguide taper is intended to reduce reflections, and consequently optical loss, at the waveguide interface, such as would occur if the two modes were not well coupled, and allows integration of the polarisation rotator on a modulator chip. Furthermore it is possible for the taper to extend in either direction in such a device.

Figure 10:
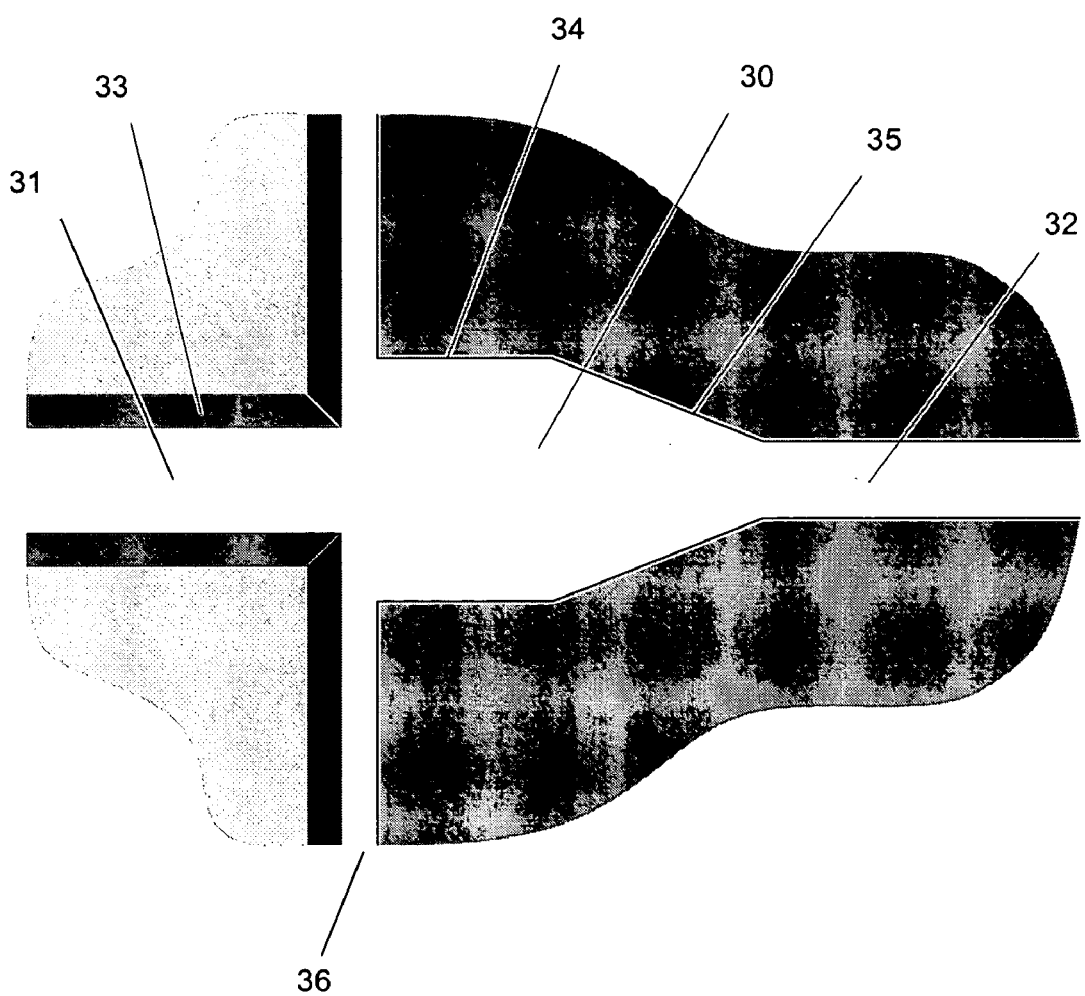
FIG. 10 diagrammatically shows a waveguide taper provided at an interface between wet etched and dry etched waveguides.

FIG. 10 shows the arrangement of such a waveguide taper 30 between a wet etched rib waveguide 31 and a dry etched ridge waveguide 32 which may incorporate such a polarisation rotator. The wet etched waveguide 31 typically has a shallow etch depth and sloping side walls 33 as a result of the nature of the wet etching process, and serves to conduct light from the optical modulator towards the polarisation rotator. The dry etched waveguide 32 is typically deeply etched and has vertical side walls as a result of the anisotropy of the dry etch process. The intermediate tapered waveguide section 30 for reducing the mode mismatch between these two waveguides 31 and 32 is formed with vertical side walls by dry etching (preferably at the same time as the dry etching of the waveguide 32) and comprises a portion having generally parallel walls 34 spaced apart by a distance substantially greater than the maximum width of the waveguide 31, and a portion having tapering walls 35 which taper downwardly from the width of the walls 34 to the width of the waveguide 32 to gradually confine the mode to the required width of the waveguide 32.

It will be appreciated that, in the production of such a design in modular fabrication, the tapered waveguide section 30 and the waveguide 32 are produced by dry etching after suitable masking of the waveguide region, for example by a patterned silica layer, the waveguide 31 being produced by a separate wet etching process so as to have sloping side walls producing less tightly confined modes. In this case the wet etched portion of the substrate and the dry etched portion of the substrate are separated by an unetched shoulder 36. It is not necessary to provide a subsequent polishing step to planarise the sides of the waveguides.

Such a waveguide taper may be used at any transition between a wet etched waveguide and a dry etched waveguide, whether or not the dry etched waveguide incorporates a polarisation rotator. Furthermore the waveguide taper may be used between the dry etched waveguide and a connection to an optical fibre, in order to increase the size of the mode. The wet etched waveguide can be identical to that used in GaAs travelling-wave modulators.

Figure 11:
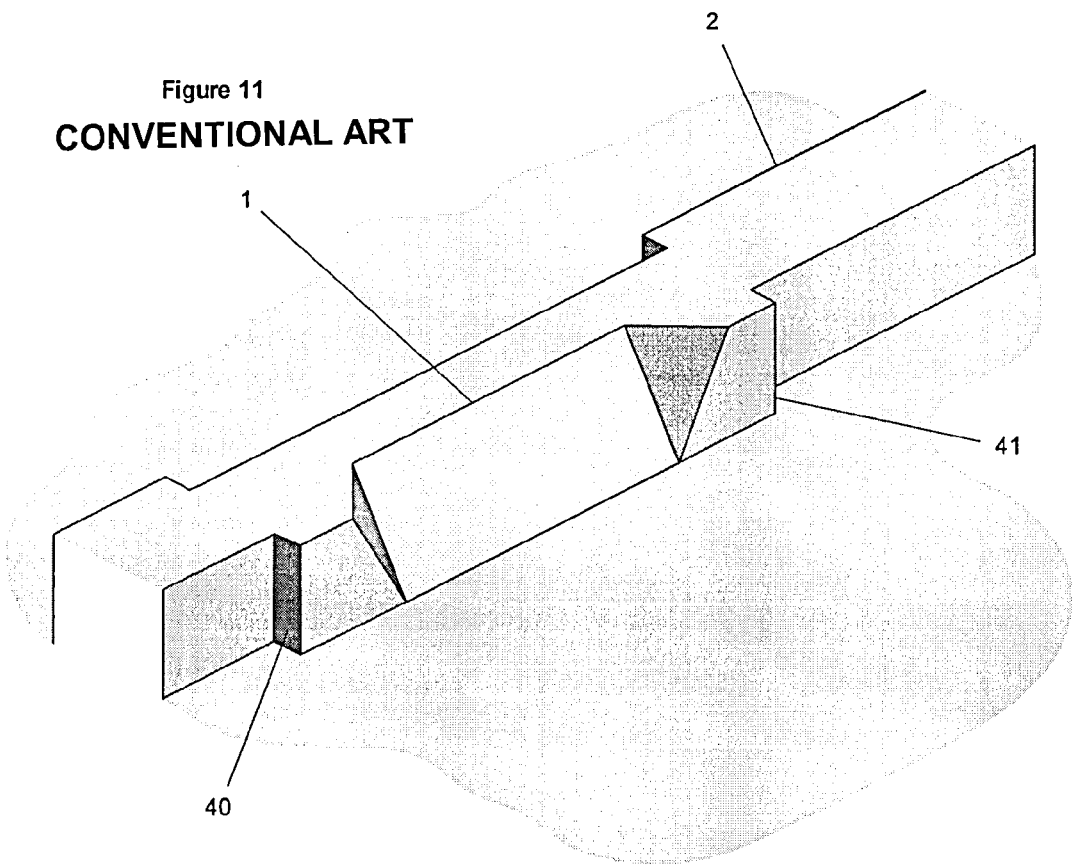
FIG. 11 is a perspective view of a prior art polarisation rotator design with offsets.

Known methods of introducing a polarisation rotator into a waveguide typically use off-sets 40 and 41 as shown (exaggerated) in FIG. 11, in order to improve the coupling between the modes in the waveguide 2 and the polarisation rotator 1. Although such off-sets may be used in association with the polarisation rotator of the invention, the off-sets are advantageously omitted since they introduce a further pair of junctions, with associated reflections, and add further lithographic alignment complexity.

Figure 12:
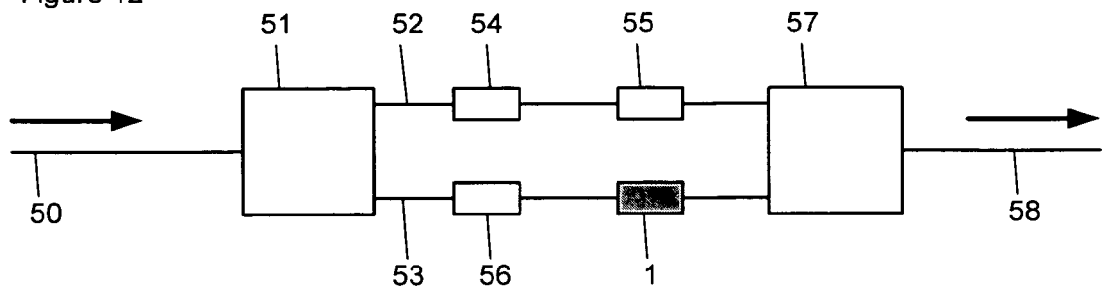
FIGS. 12, 13 and 14 diagrammatically show three exemplary applications of the polarisation rotator of the invention.
Figure 13:
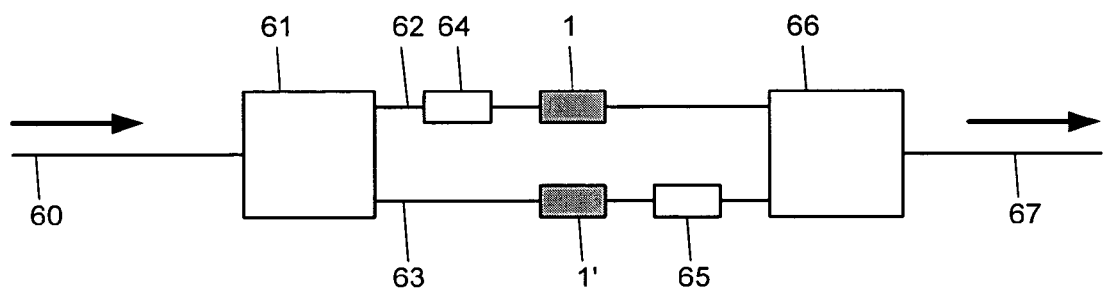
Figure 14:
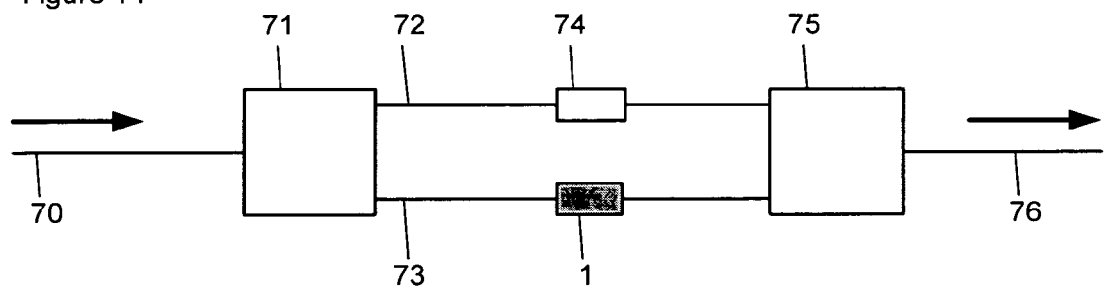

The polarisation rotator of the invention may be integrated in various optical devices, and FIGS. 12, 13 and 14 diagrammatically show three such devices incorporating at least one polarisation rotator 1. FIG. 12 shows a device for polarisation bit interleaving comprising an input 50 for receiving a single polarisation light beam, and a standard, polarisation independent optical splitter 51 for splitting the light beam between two intermediate waveguides 52 and 53, one intermediate waveguide 52 incorporating an optical amplitude modulator 54 and an optical delay element 55 and the other intermediate waveguide 53 incorporating an optical amplitude modulator 56 and the polarisation rotator 1. The outputs of the optical delay element 55 and polarisation rotator 1 are combined by an optical combiner 57, in the form of a polarisation beam splitter, which supplies the combined signal to an output 58. Optical amplitude modulators are well known, and a suitable design of optical amplitude modulator for use in this application is an GaAs Mach-Zehnder modulator.

The device of FIG. 13 shows a polarisation independent modulator arrangement that is provided for modulation of an arbitrary input state of polarisation, and comprises an input 60 for the two orthogonally polarised beams, and an optical splitter 61 in the form of a polarisation beam splitter for splitting the two polarisations between intermediate waveguides 62 and 63, one intermediate waveguide 62 incorporating an optical amplitude modulator 64 and a polarisation rotator 1, and the other intermediate waveguide 63 incorporating a polarisation rotator 1 and an optical amplitude modulator 65. The outputs of the polarisation rotator 1 and the optical amplitude modulator 65 are combined by an optical recombiner 66, in the form of a polarisation beam splitter, which supplies the combined output signal incorporating two orthogonal polarisations to an output 67. A GaAs Mach-Zehnder modulator will only act upon one of the two orthogonal polarisations of the light, so that with this arrangement polarisation independent operation can be achieved.

FIG. 14 shows a polarisation restoration device having an input 70 for an arbitrary input state of polarisation, and an optical splitter 71 in the form of a polarisation beam splitter for dividing the polarisations between two intermediate waveguides 72 and 73 incorporating an optical phase control device 74 and a polarisation rotator 1 respectively. The outputs of the phase control device 74 and the polarisation rotator 1 are combined by an optical recombiner 75 in the form of a polarisation beam splitter, which supplies the combined known single polarisation signal to an output 76.

The invention claimed is:

1. A method of fabricating a polarisation rotator comprising a substrate, a rib waveguide on a surface of the substrate having a propagation axis and opposite side walls, a recess in one of the side walls of the waveguide to provide an asymmetric waveguide section for imparting polarisation rotation to radiation propagating along the propagation axis, the recess providing a first side surface within the recess, and an etch pit adjacent said one side wall providing a second side surface adjoining the first side surface and tilted relative to the first side surface, the method including the steps of, during formation of the waveguide on the surface of the substrate, etching the etch pit in the substrate surface so as to form the recess in one of the side walls of the waveguide forming the asymmetric waveguide section for imparting polarisation rotation to radiation propagated along the propagation axis, the etching forming the first side surface within the recess, and the side walls of the waveguide being formed by a side wall etching step, wherein the side wall etching step additionally forms the second side surface adjoining the first side surface and tilted relative to the first side surface.

2. A method according to claim 1, wherein the etching steps comprise two wet etching steps having different etching properties.

3. A method according to claim 1, wherein, in the side wall etching step, dry etching is performed with only the area in which the waveguide is to be formed masked so as to etch those parts of the substrate surface on either side of that area.

4. A method according to claim 1, wherein, in the pit etching step, a wet etching mask is applied to the substrate surface so as to cover selected parts of the substrate surface and wet etching is then performed to etch the pit in the part of the substrate surface not covered by the mask.

5. A method according to claim 4, wherein the wet etching mask is formed by a patterned layer of photoresist that is removed after wet etching.

6. A method according to claim 1, wherein the etching steps comprise wet and dry etching steps.

7. A method according to claim 6, wherein the pit etching step is a wet etching step and the side wall etching step is a dry etching step.

8. A method according to claim 6, wherein the pit etching step is a dry etching step and the side wall etching step is a wet etching step.

9. A method according to claim 1, wherein, in forming the waveguide, a patterned masking layer is applied to the substrate to define the shape of the waveguide to be etched.

10. A method according to claim 9, wherein the patterned masking layer is formed by applying a layer of masking material to the substrate surface, covering the layer with photoresist, patterning the photoresist, etching the layer using the photoresist as a mask and removing the photoresist.

11. A method according to claim 9, wherein the patterned masking layer is removed after the etching of the waveguide.

12. A method according to claim 2, wherein the patterned masking layer is a layer of silica, silicon nitride or silicon oxynitride.

* * * * *